UNITED STATES PATENT OFFICE.

ARNOLD ERLENBACH, OF DESSAU, GERMANY, ASSIGNOR TO ACTIEN GESELLSCHAFT FÜR ANILIN FABRIKATION, OF BERLIN, GERMANY.

PREPARATION FOR DYEING HAIRS, FURS, AND THE LIKE.

1,105,554. Specification of Letters Patent. Patented July 28, 1914.

No Drawing. Original application filed April 9, 1910, Serial No. 554,515. Divided and this application filed September 19, 1910. Serial No. 582,699.

*To all whom it may concern:*

Be it known that I, ARNOLD ERLENBACH, a subject of the King of Bavaria, residing at Dessau, Germany, my post-office address being Schillerstrasse 5, Dessau, Germany, have invented certain new and useful Improvements in New Preparations for Dyeing Hairs, Furs, and the like, of which the following is a specification.

My present invention relates to new preparations for dyeing hairs, furs and the like. I have found that mixtures of aromatic para-diamins of the general formula:

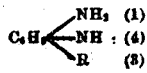

in which formula R means an inorganic substituent, such as a hydrogen atom, a chlorin atom, the hydroxyl group, the sulfonic group or the like, with an aromatic diamin of the general formula:

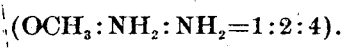

in which formula R means an oxyalkyl group, such as $OCH_3$ or $OC_2H_5$, are most excellent dyes for hairs, furs and the like. These new dyes are to be used in combination with a suitable oxidizing agent, such as hydrogen-peroxid. Thus are obtained bright blue-black tones of great stability for instance with a new preparation comprising para-phenylenediamin and meta-diaminoanisol $(OCH_3 : NH_2 : NH_2 = 1 : 2 : 4)$.

This result is very surprising because meta-diaminoanisol alone if applied to furs in the presence of a suitable oxidizing agent, produces only a reddish brown tint, whereas para-phenylenediamin alone yields a coal-black. It follows therefrom that my new mixtures react in the presence of an oxidizing agent in a very specific manner so that a joint oxidation of the two diamins appears to take place. A similar result is produced if the meta-diaminoanisol given above is substituted by the corresponding meta-diamidophenetol.

The following examples may serve to illustrate my invention, the parts being by weight:

1. 60 parts of para-phenylenediamin and 40 parts of meta-diaminoanisol are thoroughly mixed together, each of the two components being previously thoroughly ground; the components may be melted together thus forming a homogeneous mass. This new preparation in order to dye furs is dissolved in a suitable proportion of water, for instance 18000 parts. To the solution thus obtained is added 2000 parts of hydrogen peroxid of 3% strength. This mixed solution represents the dyebath in which the previously well-washed furs are handled as usual. Thus are obtained intense blue-black dyeings of great stability. The result is essentially the same if the furs to be dyed are previously mordanted with a suitable salt, for instance with a salt of iron.

The new preparation as obtained above represents in the dry state when powdered a dark gray to dark brown or black powder which is rather soluble in water to a bluish-red to dark bluish-red solution; this solution becomes on the addition of ferric chlorid dark yellowish red to dark brownish-red. On the addition of potassium bichromate it separates at once a dark violet precipitate whereas by the addition of hydrogen-peroxid and a small quantity of a caustic alkali it becomes at first lighter and browner, then dark brown and separates afterward a dark precipitate. The new composition is difficultly soluble in ether and benzene; in alcohol it dissolves to a dull violet solution and in acetone and glacial acetic acid to a dark bluish-red solution.

2. 60 parts of para-phenylenediamin and 40 parts of meta-diaminophenetol, each of these components being previously very well ground are mixed together; or the components may also be heated together so that they melt and form a homogeneous mass. Also with this new preparation, in the manner as described in the foregoing example blue-black tones of great stability are obtained on furs; also this new preparation can be applied to furs which are previously mordanted with a salt of a suitable metal, such as a salt or compound of iron.

3. In order to give an example for a new preparation comprising an aromatic para-diamin of the above-given general formula, in which R is an inorganic substituent, and an aromatic meta-diamin of the above-given general formula, the following new composition may be given: 100 parts of the sulfate of chloro-para-phenylenediamin

are thoroughly mixed with 53 parts of the sulfate of meta-diaminophenetol; this mixture represents the new preparation which may be employed for instance as follows: In preparing the dye-bath 8 parts of this new preparation are dissolved in water with the addition of 8 parts of concentrated ammonium hydroxid (0.91 specific gravity). This solution is diluted with water and to it is added 120 parts of hydrogen-peroxid (of about 3% strength) the whole being filled up with water to 1000 parts by weight. The solution thus prepared represents the dye-bath in which the furs to be dyed are introduced, after having been previously mordanted in the usual manner in an aqueous solution containing 10 parts of ferrous sulfate per 1000 parts of water. The dyeing operation is finished after about 8–10 hours, whereupon the furs are thoroughly washed with water, dried and finished in the usual way. Thus is obtained a deep black with a slightly reddish cast.

It is obvious that my present invention is not limited to the above examples or to the details given therein. First may be stated that the proportions of the ingredients may be varied in order to obtain the best result; the special proportions of the respective paradiamin and meta-diamin depend to a great deal upon the desired shade and on the other side upon the special nature of the hairs or the furs to be dyed.

Of course my new preparations may be offered to the trade either in solution, or in the solid state. In the latter case the use thereof may be performed as given in the above examples. For the preparations in the solid form also a salt of the para-diamin or of the meta-diamin respectively may be used. If my new preparations are offered as solutions these may be diluted with water to a suitable concentration and then added with a suitable oxidizing agent, such as hydrogen-peroxid, thus giving a dye-bath ready for introducing the furs or the hairs to be dyed.

Having now described my invention and the manner in which it may be performed, what I claim is:

1. As new compositions of matter, new preparations for dyeing hairs, furs and the like comprising an aromatic para-diamin of the general formula:

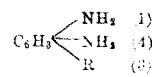

in which formula R means a univalent inorganic substituent composed at most of three inorganic elements, and an aromatic meta-diamin of the general formula:

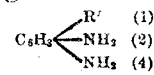

in which formula R' means an oxyalkyl group.

2. As new compositions of matter, new preparations for dyeing hairs, furs and the like comprising an aromatic para-diamin of the general formula:

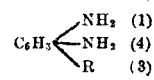

in which formula R means a hydrogen atom, and an aromatic meta-diamin of the general formula:

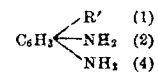

in which formula R' means an oxyalkyl group, which new preparations in the dry state when powdered form dark gray to dark brown or black powders being rather soluble in water and difficultly soluble in ether and benzene, whereas they are rather soluble in alcohol, acetone and glacial acetic acid, these new preparations producing on hairs, furs and the like in combination with an oxidizing agent bluish-black to blue black or black tints of great stability.

3. As a new composition of matter, a new preparation for dyeing hairs, furs and the like, comprising para-phenylenediamin and meta-diaminoanisol, which new preparation in the dry state when powdered forms a dark gray to dark brown or black powder which is rather soluble in water to a bluish-red to dark bluish-red, which solution on addition of ferric chlorid becomes dark yellowish red to dark brownish red and which solution on the addition of potassium bichromate at once separates a dark violet precipitate, whereas by the addition of hydrogen-peroxid and a small quantity of a caustic alkali it becomes at first lighter and browner, then dark brown and separates afterward a dark precipitate, which new composition is difficultly soluble in ether and benzene and dissolves in alcohol to a dull violet solution and in acetone and glacial acetic acid to a dark bluish-red solution, this new preparation producing on hairs, furs and the like in combination with an oxidizing agent bluish-black to blue-black of a great stability.

In testimony whereof I have hereunto set my hand in presence of two subscribing witnesses.

Dr. ARNOLD ERLENBACH.

Witnesses:
 RUDOLPH FRICKE,
 ALBERT R. MORAWETZ.